United States Patent
Tzeng et al.

[19]

[11] Patent Number: 5,867,381
[45] Date of Patent: Feb. 2, 1999

[54] FULL-WAVE RECTIFYING DEVICE HAVING AN AMPLITUDE MODULATION FUNCTION

[75] Inventors: Guang-Nan Tzeng, Taichung Hsien; Kuan-Hsi Chen, Hsinchu, both of Taiwan

[73] Assignee: Industrial Technology Research Institute, Hsinchu, Taiwan

[21] Appl. No.: 959,400

[22] Filed: Oct. 28, 1997

[30] Foreign Application Priority Data

Apr. 18, 1997 [TW] Taiwan ................................. 86105012

[51] Int. Cl.⁶ ...................................................... H02M 7/06
[52] U.S. Cl. ........................................................ 363/126
[58] Field of Search ................................. 363/44, 81, 84, 363/125, 126, 127, 128; 455/66, 74, 38.3, 343

[56] References Cited

U.S. PATENT DOCUMENTS

| | | | |
|---|---|---|---|
| 5,111,380 | 5/1992 | Nilssen | 363/132 |
| 5,349,516 | 9/1994 | Megeid | 363/21 |
| 5,422,804 | 6/1995 | Clark | 363/44 |
| 5,426,579 | 6/1995 | Paul et al. | 363/126 |
| 5,621,913 | 4/1997 | Tuttle et al. | 455/90 |
| 5,790,946 | 8/1998 | Rotzoll | 455/343 |
| 5,793,626 | 8/1998 | Jiang | 363/126 |

*Primary Examiner*—Adolf Berhane
*Attorney, Agent, or Firm*—Ladas & Parry

[57] ABSTRACT

A full-wave rectifying device having an amplitude modulation function receives energy emitted from a transceiver via an external antenna and then rectifies it into a DC power source for use by an IC device. One embodiment includes a positive half-wave diode and a negative half-wave diode, whose anodes are connected to ends of the antenna and whose cathodes are formed by the N-substrate. A rectifying NMOS transistor has its gate and drain coupled to ground and its source connected to the anode of the negative half-wave diode. A positive half-wave switch is coupled between the source and bulk of the rectifying NMOS transistor. A negative half-wave switch is coupled between the drain and bulk of the rectifying NMOS transistor. A modulating NMOS transistor has its source and bulk coupled to ground, its drain coupled to the anode of the positive half-wave diode, and its gate used to receive a modulated signal transmitted to the gate of the modulating NMOS transistor during a positive half-wave rectification for modulation. A bypass NMOS transistor has its bulk and source connected to ground, its gate coupled to the anode of the negative half-wave diode, and its drain coupled to the anode of the positive half-wave diode. A capacitor is coupled between the cathodes of the positive and negative half-wave diodes and the ground reference point to store electrical energy for use by the IC.

8 Claims, 5 Drawing Sheets

FULL-WAVE RECTIFYING DEVICE HAVING AN AMPLITUDE MODULATION FUNCTION

BACKGROUND OF THE INVENTION

1. Field of the Invention

The invention relates to a full-wave rectifying device having an amplitude modulation function, and, in particular, to an integrated circuit (IC) device containing a full-wave rectifier having an amplitude modulation function which receives energy emitted from a transceiver via an external antenna and rectifies the energy into a DC power source for use by the IC device. The full-wave rectifier also receives a modulation code set by the IC device and then transmits it to the transceiver.

2. Description of Related Art

A typical IC is provided with an external power source. Batteries are generally used to provide a direct DC power source. Alternatively, an AC power source can be supplied which is then rectified into a DC power source. A common simple rectifying device is a full bridge rectifier. As shown in FIG. 1, conventional rectifier 1 consists of 4 diodes D1, D2, D3 and D4, and capacitor $C_s$. A voltage at voltage point $V_{cc}$ represents a rectified voltage coupled to ground reference point GND through capacitor $C_s$. An AC voltage between terminals $V_{s1}$ and $V_{s2}$ is rectified into a DC voltage by rectifier 1. The DC voltage is then stored in capacitor $C_s$ for application across load $R_L$. When the AC voltage is in its positive half-wave period ($V_{s1} > V_{s2}$), diodes D1 and D3 are turned-on, while diodes D2 and D4 are turned-off. At this time, capacitor $C_s$ is charged by a current flowing through diode D1, capacitor $C_s$ and diode D3. When the AC voltage is in its negative half-wave period ($V_{s1} < V_{s2}$), diodes D2 and D4 are turned-on, while diodes D1 and D3 are turned-off. During this time, capacitor $C_s$ is charged by a current flowing through diode D2, capacitor $C_s$ and diode D4. The two charge states mentioned above alternate, thereby creating a power source at voltage point $V_{cc}$ for use by load $R_L$. However, since parasitic devices formed on the junctions among these devices (depicted by parasitic transistors Q1 and Q2), which disable the rectifying circuit, are not eliminated, this type of rectifying circuit is not suitable for ICs, and particularly for CMOS ICs. The influence of these parasitic devices on the rectifying circuit will be described in more detail below.

When rectifying circuit 1 in FIG. 1 is made into an IC, that is, two PN junctions making up diodes D1 and D4 respectively, parasitic NPN transistor Q1 is formed by an N-type region of diode D1, a P-type region of diode D4, and an N-type region of diode D4. Similarly, another NPN parasitic transistor Q2 is also formed by an N-type region of diode D2, a P-type region of diode D3, and an N-type region of diode D3. When the AC voltage is in its positive half-wave period ($V_{s1} > V_{s2}$) base B and emitter E of parasitic transistor Q2 are forward biased to turn on parasitic transistor Q2, and thereby a great amount of charge current is created to directly flow through parasitic transistor Q2 instead of through capacitor $C_s$. Therefore, the rectification efficiency is decreased, even to the point where there is no rectification at all. Similarly, the same problem caused by parasitic transistor Q1 occurs during the negative half-wave period.

Referring to FIG. 2, diodes D3 and D4 of FIG. 1 are replaced with NMOS devices N3 and N4 respectively which are manufactured by a P-well process, wherein the bulk and source of NMOS devices N3 (N4) are connected to each other and the drain and gate thereof are connected to each other. Parasitic NPN transistor Q3 (Q4) is formed by an N-type region (that is, an N-substrate connected to DC voltage point $V_{cc}$ of diode D1 (D2), the P-well region in which NMOS device N4 (N3) is located, and the $N^+$ drain of NMOS device N4 (N3). When the AC voltage is in its positive half-wave period (Vs1>Vs2), base B and emitter E of parasitic NPN transistor Q3 are forward biased to turn on parasitic NPN transistor Q3, thereby allowing a large amount of charging current to directly flow through parasitic NPN transistor Q3, and not through capacitor $C_s$, resulting in decreased rectification efficiency or no rectification at all. Similarly, the same problem caused by parasitic NPN transistor Q4 occurs during the negative half-wave period.

Referring to FIG. 3, diodes D3 and D4 of FIG. 1 are replaced with PMOS devices P3 and P4 respectively, wherein the bulk (that is, N-substrate) of each PMOS device is connected to voltage point $V_{cc}$, and the drain and gate of each PMOS device are connected to each other. Parasitic PNP transistor Q5 (Q6) is formed by the $P^+$ source, bulk and $P^+$ drain of parasitic PNP transistor P4 (P3). This parasitic transistor does not affect the operation of the rectifying circuit. However, since a voltage difference exists between the bulk and source of the PMOS transistor, a body effect occurs in PMOS P3 (P4) resulting in poor rectification efficiency and speed.

As can be seen from the above, using PMOS devices having poor rectification efficiency in place of the diodes is a better choice.

Referring to FIG. 4A, a conventional full-wave rectifying device having an amplitude modulation function is shown. External antenna ANT is made up of an inductor L and a capacitor C, one end of external antenna ANT being connected to terminal Vs1 and the other end being connected to terminal Vs2. The rectifying circuits shown in FIG. 4A and FIG. 3 are both manufactured by a P-well process. The main difference between them is that PMOS transistor P4 of FIG. 3 is replaced with NMOS transistor $M_N$, wherein the bulk and source of NMOS transistor $M_N$ are connected to each other, and the gate of NMOS transistor $M_N$ receives signal modulation control signal $S_{MOD}$ transmitted from an IC. NMOS transistor $M_N$ chiefly functions as a modulating transistor. The modulation function can be implemented by controlling the on/off states of NMOS transistor $M_N$ to change the energy of the antenna inductor. However, parasitic NPN transistor $Q_N$ is formed by an N-type region (that is N-substrate) of diode D1, the P-well region of NMOS transistor $M_N$ and the $N^+$ drain of NMOS transistor $M_N$.

As for the operation of rectification, when an AC voltage is in its positive half-wave period (Vs1>Vs2), diode D1 is turned on and capacitor $C_s$ is charged. At this point, a charge current flows to terminal $V_{s2}$ via PMOS transistor P3, thereby accomplishing positive half-wave rectification. When the AC voltage is in its negative half-wave period ($V_{s1} < V_{s2}$), diode D2 is turned on, and capacitor $C_s$ is charged. At this point, the junction between base B and emitter E of parasitic transistor $Q_N$ is turned on, thereby accomplishing negative half-wave rectification. However, during the negative half-wave period, since terminal $V_{s2}$ is positive with respect to terminal $V_{s1}$, the junction between emitter E and base B of parasitic PNP transistor Q6 is forward biased, thereby turning on NPN transistor $Q_N$ resulting in a discharge of capacitor $C_s$ and affecting the rectification effect in the negative half-wave period.

Referring to FIG. 4B, an equivalent circuit of a full-wave rectifying device having an amplitude modulation function of FIG. 4A is depicted. An equivalent current source $I_M$ represents the external antenna, and $R_{in}$ (viewed from the both ends of the antenna towards the inside) represents an equivalent input resistor. The value of $R_{in}$ can be varied by controlling the degrees of the on-state of the $M_N$ transistor resulting in the voltage variation on the both ends of the antenna, thereby implementing the purpose of the amplitude modulation. Nevertheless, since the bulk of PMOS transistor P3 is connected to high-voltage $V_{cc}$, the characteristics of PMOS transistor P3 are influenced by the body effect to cause its turned-on resistance to increase, such that the rectification efficiency is decreased. This affects the modulation index, which reduces the modulation efficiency.

Therefore, the disadvantages of the prior art are as follows:

(1) due to the influence caused by the PMOS body effect during the positive half-wave period, and the discharge of the capacitor $C_s$ resulting from the turned-on period of the transistor $Q_N$ during the negative half-wave period, the rectification efficiency is greatly reduced, resulting in an inability to endure a higher load.

(2) since the lower rectification efficiency during the negative half-wave period causes a lower voltage at voltage point $V_{cc}$, the voltage level for controlling the turned-on period of NMOS transistor $M_N$ is relatively decreased. Therefore, the degree of the turned-on period of NMOS transistor $M_N$ is not complete, and the lower amplitude of wave trough can not be acquired. In addition, due to the body effect of the PMOS, the modulation efficiency becomes poor during transmission.

(3) since NPN transistor $Q_N$ and PNP transistor Q6 exist simultaneously, if parameters such as current amplification ratio β of the parasitic transistor in the process can not be controlled well, an SCR formed by the transistors $Q_N$ and Q6 easily produces latch-up.

SUMMARY OF THE INVENTION

In view of the above, the object of the invention is to provide a full-wave rectifying device having an amplitude modulation function, thereby preventing the body effect which can affect the rectification efficiency, during a positive half-wave rectification. Furthermore, the probability of turning on the parasitic transistor is reduced during negative half-wave rectification, thereby increasing the rectification efficiency and avoiding latch-up. Moreover, due to an increased rectification efficiency and higher rectified voltage, better rectification efficiency and greater load endurance can be obtained.

A full-wave rectifying device having an amplitude modulation function according to the invention receives energy emitted from a transceiver via an external antenna, then rectifying it into a DC power source for the use of an IC. The full-wave rectifier also receives a modulation code set by the IC device and then transmits it to the transceiver. This full-wave rectifying device having an amplitude modulation function, an IC device, manufactured by a P-well process on an N-substrate, includes:

(1) a positive half-wave diode and a negative half-wave diode, wherein their anodes are connected to the both ends of the antenna respectively, and their cathodes are formed by the N-substrate;

(2) a rectifying NMOS transistor manufactured by use of a P-well process, the gate and drain of which are coupled to a ground reference point, and source of which is connected to the anode of the negative half-wave diode;

(3) a positive half-wave switch coupled between the source and bulk of the above-mentioned rectifying NMOS transistor;

(4) a negative half-wave switch coupled between the drain and bulk of the rectifying NMOS transistor;

(5) a modulating NMOS transistor manufactured by use of a P-well process, the source and bulk of which are coupled to the ground reference point, the drain of which is coupled to the anode of the positive half-wave diode, and the gate of which is used to receive a modulated signal which is transmitted to the gate of this modulating NMOS transistor during a positive half-wave rectification for modulation;

(6) a bypass NMOS transistor, the bulk and source of which are connected to the ground reference point, the gate of which is coupled to the anode of the negative half-wave diode, and the drain of which is coupled to the anode of the positive half-wave diode; and (7) a capacitor coupled between the cathodes of the positive and negative half-wave diodes and the ground reference point to store electrical energy for use by the IC.

During positive half-wave rectification, the positive half-wave switch SW1 beside the rectifying NMOS transistor is in an on-state, while the negative half-wave switch SW2 is in an off state. However, during a negative half-wave rectification, the negative half-wave switch SW2 is in an on-state, while the positive half-wave switch SW1 is in an off state.

Furthermore, a full-wave rectifying device having an amplitude modulation function according to the invention can be manufactured by use of an N-well process in a P substrate. This full-wave rectifying device having an amplitude modulation function includes:

(1) a positive half-wave diode and a negative half-wave diode, wherein their cathodes are connected to both ends of the antenna respectively, and their anodes are formed by the P substrate, wherein the P substrate acts as a ground reference point;

(2) a rectifying PMOS transistor, manufactured by use of a N-well process, the gate and drain of which are coupled to each other, the source of which is connected to the cathode of the negative half-wave diode, and the drain of which is connected to a node;

(3) a positive half-wave switch coupled between the source and bulk of the above-mentioned rectifying PMOS transistor;

(4) a negative half-wave switch coupled between the drain and bulk of the rectifying PMOS transistor;

(5) a modulating PMOS transistor manufactured by use of a N-well process, the source and bulk of which are coupled to the connection node, the drain of which is coupled to the cathode of the positive half-wave diode, and the gate of which is used to receive a modulated signal which is transmitted to the gate of the modulating PMOS during positive half-wave rectification for modulation;

(6) a bypass PMOS transistor, the bulk and source of which are connected to the connection node, the gate of which is coupled to the cathode of the negative half-wave diode, and the drain of which is coupled to the cathode of the positive half-wave diode; and (7) a capacitor coupled between the connection node and the ground reference point to store electrical energy for use by the IC.

BRIEF DESCRIPTION OF THE DRAWINGS

The present invention will become more fully understood from the detailed description given hereinbelow and the accompanying drawings, which are provided to illustrate preferred embodiments and should not be construed as limiting the scope of the present invention.

DETAILED DESCRIPTION OF THE INVENTION

EMBODIMENT 1

Figure 5:
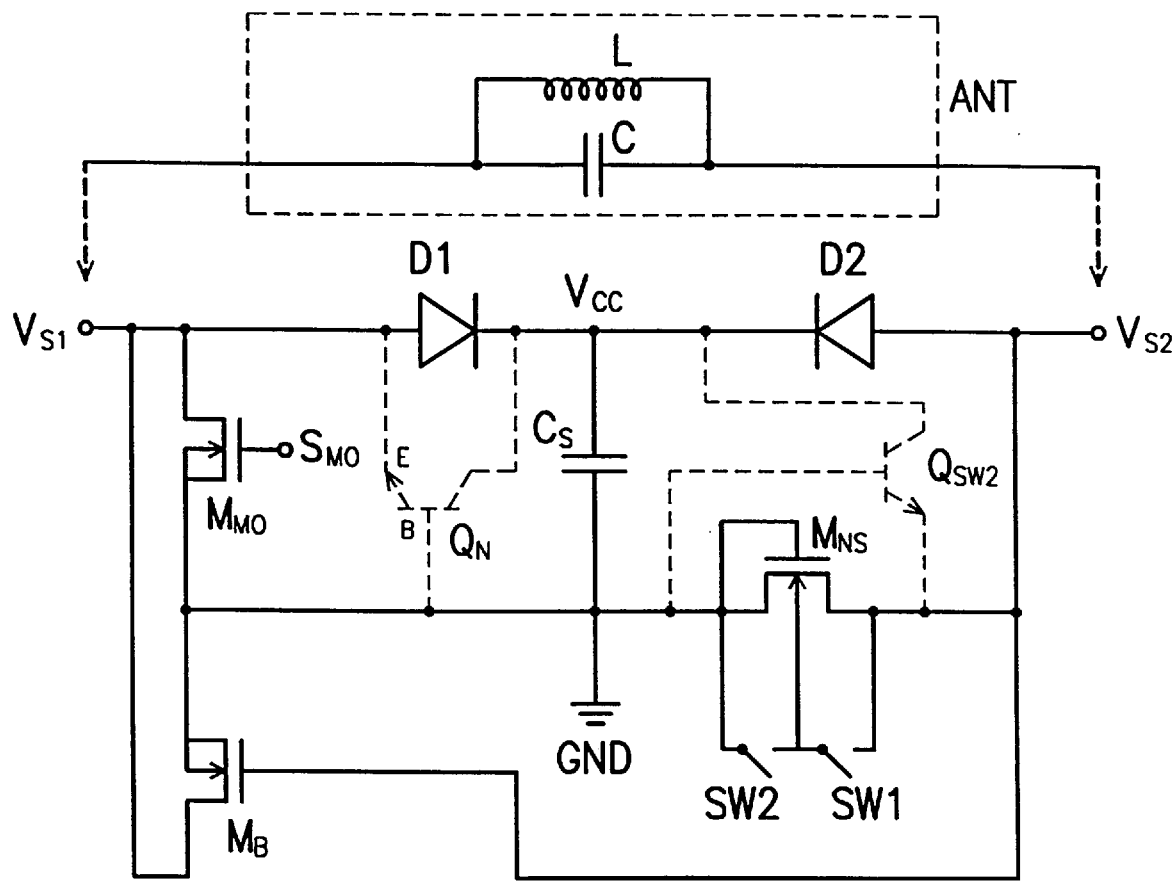
FIG. 5 is a circuit diagram showing a full-wave rectifying device having an amplitude modulation function according to a first embodiment of the invention.

Referring to FIG. 5, a full-wave rectifying device having an amplitude modulation function according to a first embodiment of the invention, connected with an external antenna consisting of inductor L and capacitor C, is shown. This full-wave rectifying device includes:

(1) positive half-wave diode D1 and negative half-wave diode D2, wherein their anodes are connected to both ends $V_{s1}$ and $V_{s2}$ of antenna ANT respectively, and their cathodes are coupled to voltage point $V_{cc}$;

(2) rectifying NMOS transistor $M_{NS}$, the gate and drain of which are coupled to ground reference point GND, and the source of which is connected to the anode of negative half-wave diode D2;

(3) positive half-wave switch SW1 coupled between the source and bulk of rectifying NMOS transistor $M_{NS}$;

(4) negative half-wave switch SW2 coupled between the drain and bulk of rectifying NMOS transistor $M_{NS}$;

(5) modulating NMOS transistor $M_{MO}$, the source and bulk of which are coupled to ground reference point GND, the drain of which is coupled to the anode of positive half-wave diode D1, and the gate of which is used to receive modulated signal $S_{MO}$ corresponding to the modulation code mentioned in the "SUMMARY OF THE INVENTION";

(6) bypass NMOS transistor $M_B$, the bulk and source of which are connected to ground reference point GND, the gate of which is coupled to the anode of negative half-wave diode D2, and the drain of which is coupled to the anode of positive half-wave diode D1; and (7) capacitor $C_S$ coupled between voltage point $V_{CC}$ and ground reference point GND to store electrical energy for the use by the IC.

Moreover, voltage point $V_{cc}$ is connected to an N substrate used for manufacturing the full-wave rectifying device. Other P-wells are connected to ground reference point GND, except for the bulk of rectifying NMOS transistor $M_{NS}$. Parasitic transistor $Q_{SW2}$ is formed among the interfaces of rectifying NMOS transistor $M_{NS}$ when negative half-wave switch SW2 is switched on during a negative half-wave period.

Figure 1:
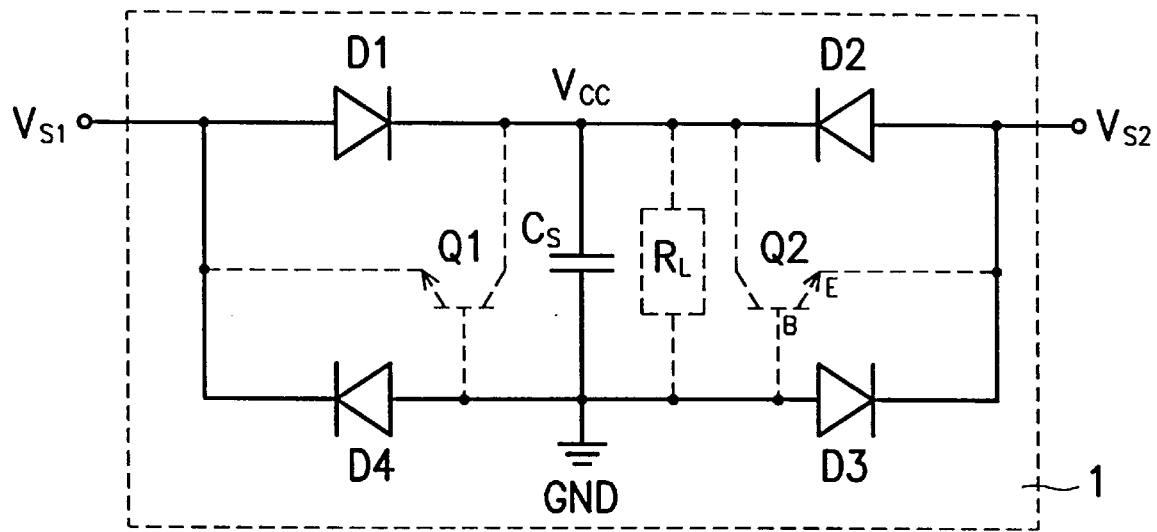
FIG. 1 is a circuit diagram showing a full-wave rectifying device according to the prior art.
Figure 2:
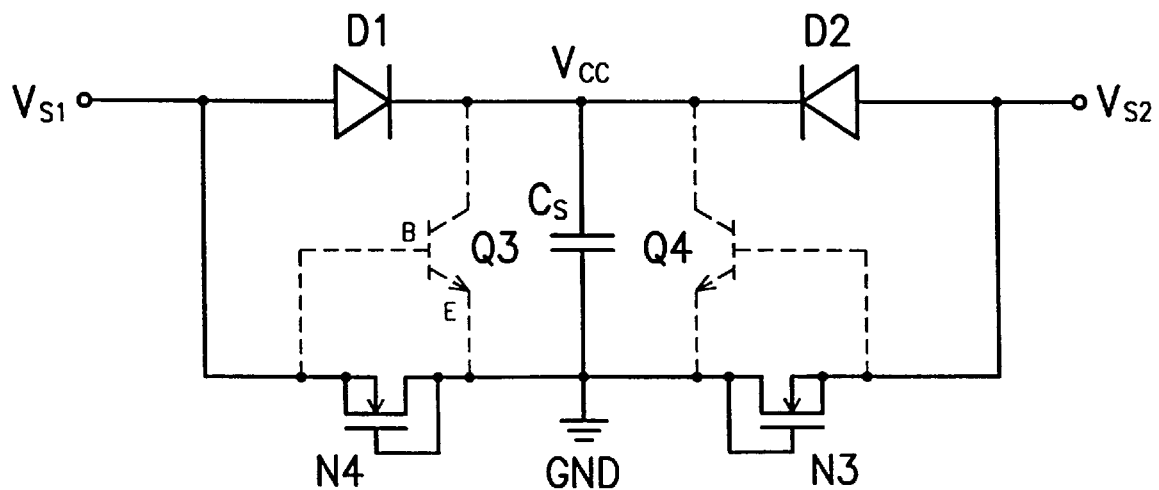
FIG. 2 is a circuit diagram showing a full-wave rectifying device including two NMOS transistors according the prior art.
Figure 3:
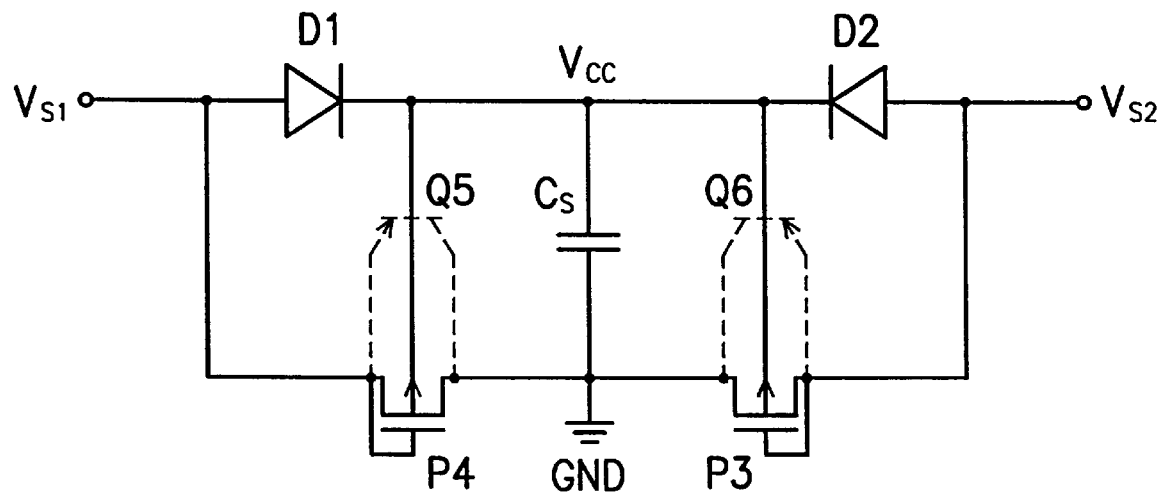
FIG. 3 is a circuit diagram showing a full-wave rectifying device including two PMOS transistors according to the prior art.

When voltage point $V_{s1}$ is greater than voltage point $V_{s2}$ during a positive half-wave period, positive half-wave switch SW1 is in an on-state while negative half-wave switch SW2 is in an off-state. In this case, NMOS rectifying transistor $M_{NS}$ is similar to NMOS device N3 as shown in FIG. 2. Since diode D1 and NMOS rectifying transistor $M_{NS}$ are in an on-state, and diode D2 and bypass NMOS transistor $M_B$ are in an off-state, capacitor Cs is charged to achieve positive half-wave rectification. When voltage point $V_{s2}$ is greater than voltage point $V_{s1}$ during a negative half-wave period, negative half-wave switch SW2 is in an on-state while positive half-wave switch SW1 is in an off-state. In this case, diode D2 is turned on and capacitor $C_S$ is charged to turn on bypass NMOS transistor $M_B$, thereby achieving a negative half-wave rectification.

Figure 4A:
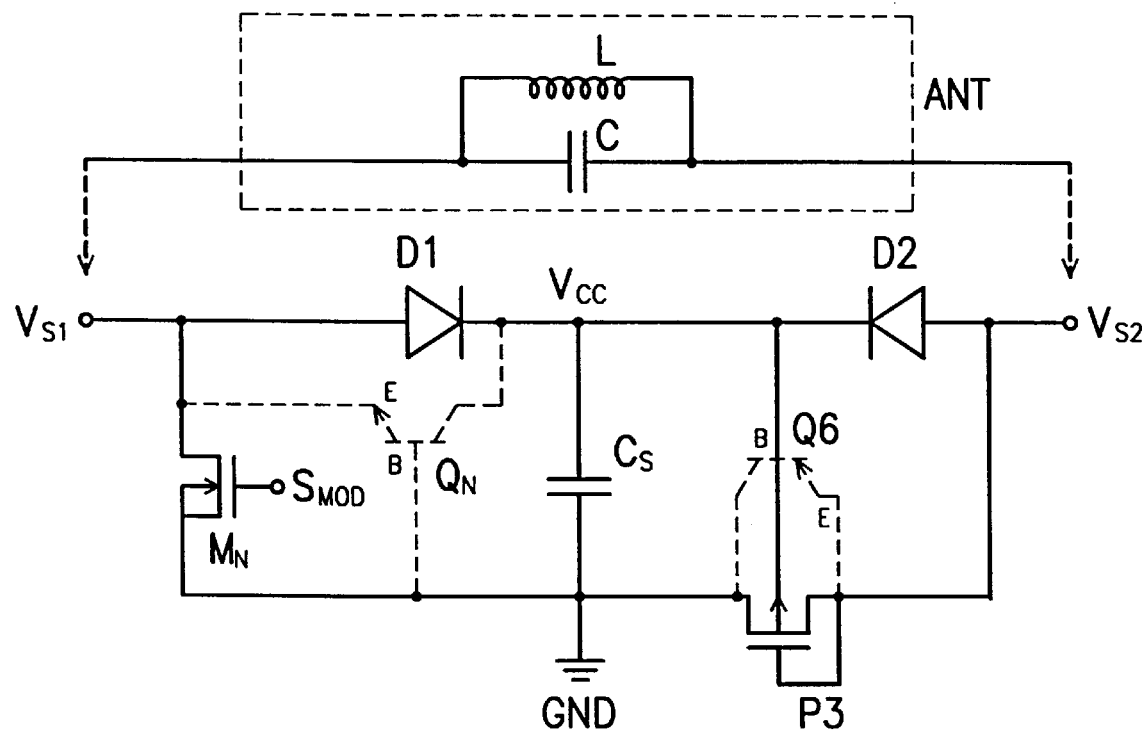
FIG. 4A is a circuit diagram showing a full-wave rectifying device having an amplitude modulation function according to the prior art.
Figure 4B:
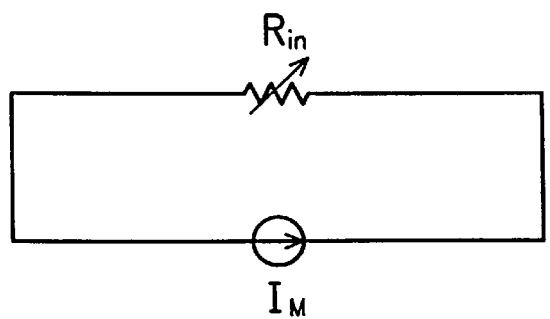
FIG. 4B is an equivalent circuit diagram of FIG. 4A.

It can be seen that parasitic transistor $Q_{SW2}$ shown in FIG. 5 is not created during a negative half-wave rectification. Therefore, unlike parasitic transistor $Q_{SW2}$ described in FIG. 2, a leakage current resulting in a low efficiency does not occur during negative half-wave rectification. Moreover, when NMOS bypass transistor $M_B$ is turned on during negative half-wave rectification, a charging path is provided. At the same time, a low efficiency caused by a small leakage current at the junction between the base and emitter of parasitic transistor $Q_N$ of the prior art (see FIG. 4) is prevented. In addition, parasitic transistors $Q_{SW2}$ and $Q_N$ do not form the structure of the SCR shown in FIG. 4A that produces latch-up.

During a negative half-wave period, negative half-wave switch SW2 is at an on-state and positive half-wave switch SW1 is in an off-state, thereby connecting the bulk of NMOS rectifying transistor $M_{NS}$ to ground reference point GND to prevent NMOS rectifying transistor $M_{NS}$ from being affected by the body effect. Therefore, in addition to being able to increase the efficiency, better modulation can also be obtained.

The comparisons between the invention and prior art according to experiments will be described hereinafter.

(1) Table 1 shows a comparison between the invention and prior art under a control having the same modulation code and without an extra load.

TABLE 1

|  | Modulation code | Vs1–Vs2 | Modulation index | Reading distance |
|---|---|---|---|---|
| Prior Art | 00013AEFC1 | 5.54 V | 22.8% | 17 cm |
| Invention | 00013AEFC1 | 5.52 V | 39.8% | 18 cm |

As is evident from Table 1, the invention is better in modulation index and reading distance than the prior art.

(2) Table 1 shows a comparison between the invention and the prior art under a control having the same modulation code and with an extra load.

TABLE 2

|  | Prior Art | Invention | Prior Art | Invention |
|---|---|---|---|---|
| Modulation code | 01E007D9C0 | 01E007D900 | 01E007D731 | 01E007D731 |
| Load 1 | 4.7 KΩ | 4.7 KΩ | 4.7 KΩ | 4.7 KΩ |
| Reading distance | 5.5 cm | 6 cm | 5.5 cm | 6 cm |
| Load 2 | 3 KΩ | 3 KΩ | 3 KΩ | 3 KΩ |
| Reading distance | 4 cm | 5 cm | 4 cm | 5 cm |

As is evident from Table 2, when the load is increased from 4.7 KΩ to 3 KΩ in the prior art, the reading distance decreases from 5.5 cm to 4 cm. However, when the load is increased from 4.7 KΩ to 3 KΩ in the invention, the reading distance decreases from 6 cm to 5 cm. Therefore, the full-wave rectifying device according to the invention can endure a greater load.

EMBODIMENT 2

Figure 6:
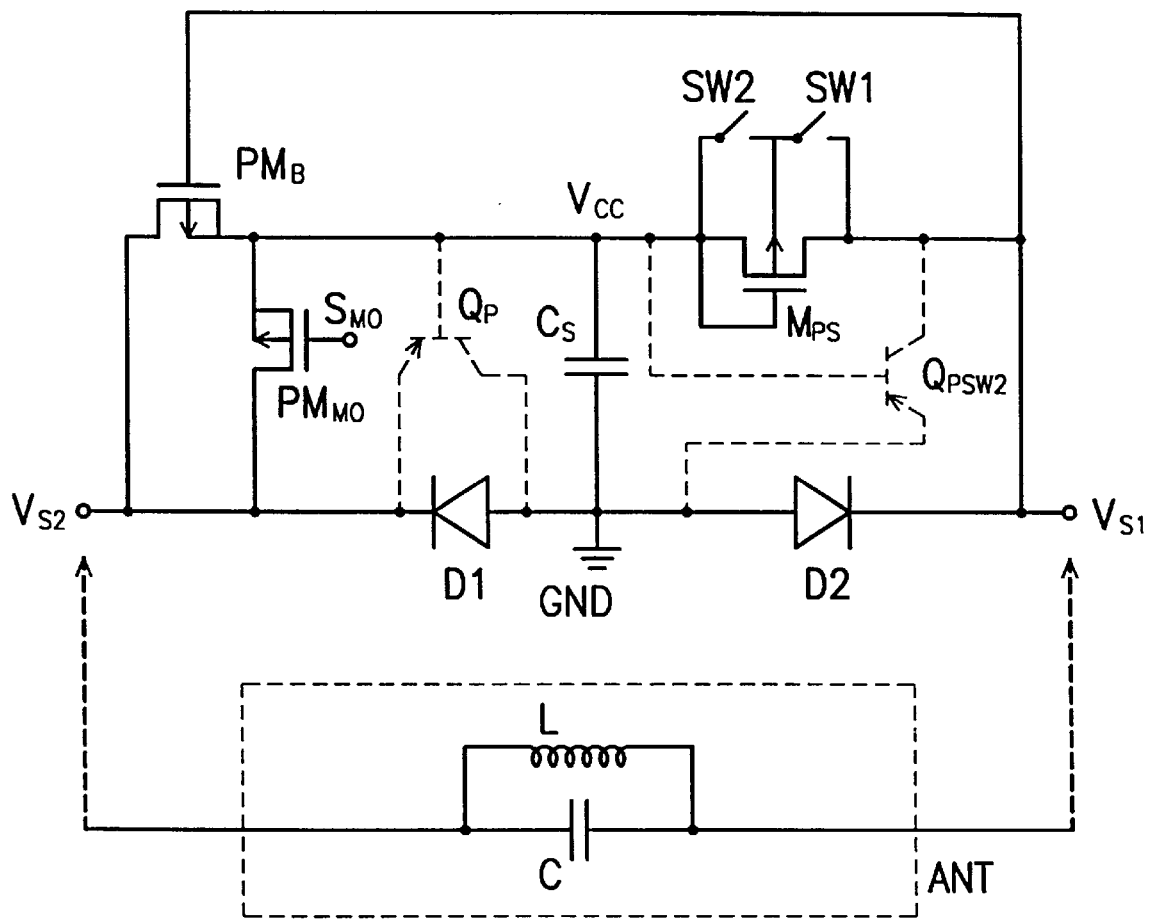
FIG. 6 is a circuit diagram showing a full-wave rectifying device having an amplitude modulation function according to a second embodiment of the invention.

Referring to FIG. 6, a full-wave rectifying device having an amplitude modulation function according to a second embodiment of the invention, connected with an external antenna consisting of an inductor L and a capacitor C, is shown. This full-wave rectifying device includes:

(1) positive half-wave diode D1 and negative half-wave diode D2, wherein their cathodes are connected to both ends, $V_{s1}$ and $V_{s2}$, of antenna ANT respectively, and their anodes are coupled to ground reference point GND formed by a P substrate;

(2) rectifying PMOS transistor $M_{PS}$, the gate and drain of which are coupled to voltage point $V_{cc}$, and the source of which is connected to the cathode of negative half-wave diode D2;

(3) positive half-wave switch SW1 coupled between the source and bulk of rectifying PMOS transistor $M_{PS}$;

(4) negative half-wave switch SW2 coupled between the drain and bulk of rectifying PMOS transistor $M_{PS}$;

(5) modulating PMOS transistor $PM_{MO}$, the source and bulk of which are coupled to voltage point $V_{cc}$, the drain of which is coupled to the cathode of positive half-wave diode D1, and the gate of which is used to receive modulated signal $S_{MO}$ corresponding to the modulation code;

(6) bypass PMOS transistor $PM_B$, the bulk and source of which are connected to voltage point $V_{cc}$, the gate of which is coupled to the cathode of negative half-wave diode D2, and the drain of which is coupled to the cathode of positive half-wave diode D1; and (7) capacitor $C_S$ coupled between voltage point $V_{CC}$ and ground reference point GND to store electrical energy for the use by the IC.

Moreover, ground reference point GND is connected to a P substrate used for manufacturing the full-wave rectifying device. Other N-wells are connected to voltage point $V_{cc}$, except for the bulk of rectifying PMOS transistor $M_{pS}$. Furthermore, Parasitic transistor $Q_{PSW2}$ is formed among the interfaces of rectifying PMOS transistor $M_{pS}$ when negative half-wave switch SW2 is switched on during a negative half-wave period. Parasitic transistor $Q_p$ is formed between the positive half-wave diode D1 and modulating PMOS transistor $PM_{MO}$ during a positive half-wave period.

When the voltage at voltage point $V_{s1}$ is greater than the voltage at voltage point $V_{s2}$ during a positive half-wave period, positive half-wave switch SW1 is in an on-state while negative half-wave switch SW2 is at an off-state. In this case, since diode D1 and $M_{pS}$ are at an on-state, and diode D2 and bypass PMOS transistor $PM_B$ are in an off-state, capacitor Cs is charged to achieve positive half-wave rectification. When the voltage at voltage point $V_{s2}$ is greater than the voltage at voltage point $V_{s1}$ during a negative half-wave period, negative half-wave switch SW2 is in an on-state while positive half-wave switch SW1 is in an off-state. In this case, diode D2 is turned on and capacitor $C_S$ is charged to turn on bypass PMOS transistor $PM_B$, thereby achieving negative half-wave rectification.

As can be seen, parasitic transistor $Q_{PSW2}$ as shown in FIG. 6 is not created during negative half-wave rectification. Therefore, a leakage current resulting in a low efficiency does not occur during negative half-wave rectification. Moreover, when bypass PMOS transistor $PM_B$ is turned on during negative half-wave rectification, a charging path is provided. At the same time, a low efficiency caused by a small leakage current at the junction between base and emitter of parasitic transistor $Q_N$ in the prior art is prevented. In addition, parasitic transistors $Q_{PSW2}$ and $Q_N$ do not form the structure of the SCR shown in FIG. 4A that produces latch-up.

In summary, a full-wave rectifying device having an amplitude modulation function according to one embodiment of the invention in comparison with that in the prior has the following advantages:

(1) During the positive half-wave period, rectifying NMOS transistor $M_{NS}$ is at an on-state and is not affected by the body effect, so this full-wave rectifying device has better rectification efficiency and modulation.

(2) During the negative half-wave period, bypass transistor $M_B$ is turned on to reduce the turned-on probability of parasitic transistor $Q_N$. Since negative half-wave switch SW2 is switched, parasitic transistors $Q_{SW2}$ and $Q_N$ do not cause SCR latch-up.

(3) Since the rectification efficiency and rectified voltage $V_{cc}$ are higher, this full-wave rectifying device can bear a greater load.

Although the invention has been disclosed in terms of a preferred embodiment, the disclosure is not intended to limit the invention. Those knowledgeable in the art can make modifications within the scope and spirit of the invention which is determined by the claims below.

What is claimed is:

1. A full-wave rectifying device having an amplitude modulation function as an IC device formed by a P-well process on an N-substrate, comprising:

a positive half-wave diode and a negative half-wave diode, wherein an anode of the positive half-wave diode is connected to one end of an antenna and an anode of the negative half-wave diode anode is connected to an other end of the antenna, and wherein a cathode of the positive half-wave diode and a cathode of the negative half-wave diode are each formed by the N-substrate;

a rectifying NMOS transistor, formed by the P-well process, a gate of the rectifying NMOS transistor being coupled to a ground reference point, a drain of the rectifying NMOS transistor being coupled to the ground reference point, and a source of the rectifying NMOS transistor being connected to the anode of the negative half-wave diode;

a positive half-wave switch coupled between a source of the rectifying NMOS transistor and a bulk of the rectifying NMOS transistor;

a negative half-wave switch coupled between a drain of the rectifying NMOS transistor and the bulk of the rectifying NMOS transistor;

a modulating NMOS transistor formed by the P-well process, a source of the modulating NMOS transistor and a bulk of the modulating NMOS transistor being coupled to the ground reference point, a drain of the modulating NMOS transistor being coupled to the anode of the positive half-wave diode, and a gate of the modulating NMOS transistor being used to receive a modulated signal which is transmitted to the gate of the modulating NMOS transistor during positive half-wave rectification for modulation;

a bypass NMOS transistor, a bulk of the bypass NMOS transistor and a source of the bypass NMOS transistor being connected to the ground reference point, a gate of the bypass NMOS transistor being coupled to the anode of the negative half-wave diode, and a drain of the bypass NMOS transistor being coupled to the anode of the positive half-wave diode; and a capacitor coupled between the cathode of the positive half-wave diode, the cathode of the negative half-wave diode and the ground reference point, to store electrical energy for the use by the IC.

2. The full-wave rectifying device as claimed in claim 1, wherein:

the positive half-wave switch is in an on-state and negative half-wave switch is in an off-state during positive half-wave rectification; and the negative half-wave switch is in an on-state and the positive half-wave switch is in an off-state during negative half-wave rectification.

3. The full-wave rectifying device as claimed in claim 2, wherein the positive half-wave switch and the negative half-wave switch are formed by the P-well process.

4. The full-wave rectifying device as claimed in claim 1, wherein the N-substrate includes at least a P-well region which is coupled to the connection node.

5. The full-wave rectifying device having an amplitude modulation function as an IC device formed by an N-well process on a P-substrate, comprising:

a positive half-wave diode and a negative half-wave diode, wherein a cathode of the positive half-wave diode is connected to one end of an antenna and a cathode of the negative half-wave diode is connected to an other end of the antenna, and the anode of the positive half-wave diode and the anode of the negative half-wave diode being formed by the P-substrate, wherein the P-substrate acts as a ground reference point;

a rectifying PMOS transistor, formed by the N-well process, a gate of the rectifying PMOS transistor and a drain of the rectifying PMOS transistor each being coupled to a connection node, and a source of the rectifying PMOS transistor being connected to the cathode of the negative half-wave diode;

a positive half-wave switch coupled between the source of the rectifying PMOS transistor and the bulk of the rectifying NMOS transistor;

a negative half-wave switch coupled between the drain and bulk of the rectifying PMOS transistor;

a modulating PMOS transistor formed by the N-well process, the source of the modulating PMOS transistor being coupled to a connection node, the bulk of the modulating PMOS transistor being coupled to the connection node, the drain of the modulating PMOS transistor being coupled to the cathode of the positive half-wave diode, and the gate of the modulating PMOS transistor being used to receive a modulated signal which is transmitted to the gate of the modulating PMOS transistor during a positive half-wave rectification for modulation;

a bypass PMOS transistor, a bulk of the bypass PMOS transistor being connected to the connection point, a source of the bypass PMOS transistor being connected to the connection point, a gate of the bypass PMOS transistor being coupled to cathode of the negative half-wave diode, and the drain of the bypass PMOS transistor being coupled to the cathode of the positive half-wave diode; and a capacitor coupled between the connection node and the ground reference point to store electrical energy for the use by the IC.

6. The full-wave rectifying device as claimed in claim 1, wherein the positive half-wave switch is in an on-state and negative half-wave switch is in an off-state during positive half-wave rectification; and the negative half-wave switch is in an on-state and the positive half-wave switch is in an off-state during negative half-wave rectification.

7. The full-wave rectifying device as claimed in claim 6, wherein the positive half-wave switch and the negative half-wave switch are formed by the N-well process.

8. The full-wave rectifying device as claimed in claim 5, wherein the P-substrate includes at least an N-well region which is coupled to the connection node.

* * * * *